US012586401B2

(12) United States Patent
Ball et al.

(10) Patent No.: US 12,586,401 B2
(45) Date of Patent: Mar. 24, 2026

(54) SYSTEMS AND METHODS FOR REPRESENTING AND SEARCHING CHARACTERS

(71) Applicant: HanziFinder LLC, Solana Beach, CA (US)

(72) Inventors: Jennifer Maureen Ball, Solana Beach, CA (US); Chao Xu, Huai'an (CN)

(73) Assignee: HanziFinder LLC, Solana Beach, CA (US)

( * ) Notice: Subject to any disclaimer, the term of this patent is extended or adjusted under 35 U.S.C. 154(b) by 467 days.

(21) Appl. No.: 18/074,942

(22) Filed: Dec. 5, 2022

(65) Prior Publication Data

US 2023/0230403 A1 Jul. 20, 2023

Related U.S. Application Data

(60) Provisional application No. 63/286,266, filed on Dec. 6, 2021.

(51) Int. Cl.
| | |
|---|---|
| *G06V 30/28* | (2022.01) |
| *G06V 30/18* | (2022.01) |
| *G06V 30/196* | (2022.01) |
| *G06V 30/262* | (2022.01) |

(52) U.S. Cl.
CPC ...... *G06V 30/293* (2022.01); *G06V 30/18076* (2022.01); *G06V 30/1988* (2022.01); *G06V 30/274* (2022.01)

(58) Field of Classification Search
CPC ........... G06V 30/293; G06V 30/18076; G06V 30/1988; G06V 30/274
See application file for complete search history.

(56) References Cited

U.S. PATENT DOCUMENTS

| | | | |
|---|---|---|---|
| 2003/0138145 A1* | 7/2003 | Sugano | G06V 30/1423 382/185 |
| 2009/0324107 A1* | 12/2009 | Walch | G06V 30/18181 382/224 |
| 2010/0189316 A1 | 7/2010 | Walch | |
| 2011/0188756 A1* | 8/2011 | Lee | G06F 40/53 382/185 |

(Continued)

FOREIGN PATENT DOCUMENTS

| | | | |
|---|---|---|---|
| JP | 2000148743 A | * | 5/2000 |
| WO | WO-2023/105291 A2 | | 6/2023 |

OTHER PUBLICATIONS

International Search Report and Written Opinion for International Application No. PCT/IB2022/000760, mailed Jul. 25, 2023 (10 pages).

*Primary Examiner* — Emily C Terrell
*Assistant Examiner* — Daniella M. DiGuglielmo
(74) *Attorney, Agent, or Firm* — Goodwin Procter LLP

(57) ABSTRACT

Methods and supporting systems for representing and searching characters, comprising: obtaining an image of a character, labelling a structure of the character by defining a plurality of nodes and a plurality of edges on the character in the image, and generating a representation of the character by extracting a set of two-dimensional coordinates to represent the plurality of nodes and by extracting a matrix to represent the plurality of edges, and providing the representation in a searchable database.

6 Claims, 17 Drawing Sheets

(56) References Cited

U.S. PATENT DOCUMENTS

| | | | |
|---|---|---|---|
| 2014/0328541 A1* | 11/2014 | Sun | G06V 30/32 |
| | | | 382/181 |
| 2015/0213313 A1 | 7/2015 | Chulinin | |
| 2016/0188990 A1* | 6/2016 | Hosabettu | G06V 30/1902 |
| | | | 382/177 |
| 2018/0032508 A1 | 2/2018 | Matskevich et al. | |
| 2018/0137155 A1* | 5/2018 | Majumdar | G06F 16/2228 |
| 2021/0073287 A1* | 3/2021 | Hunter | H04L 63/123 |

* cited by examiner

Obtain an image of a character
310

Label a structure of the character by identifying a plurality of nodes and a plurality of edges within the character in the image
320

Generate a representation of the character comprising a set of two-dimensional coordinates to represent the plurality of nodes and a matrix representing the plurality of edges
330

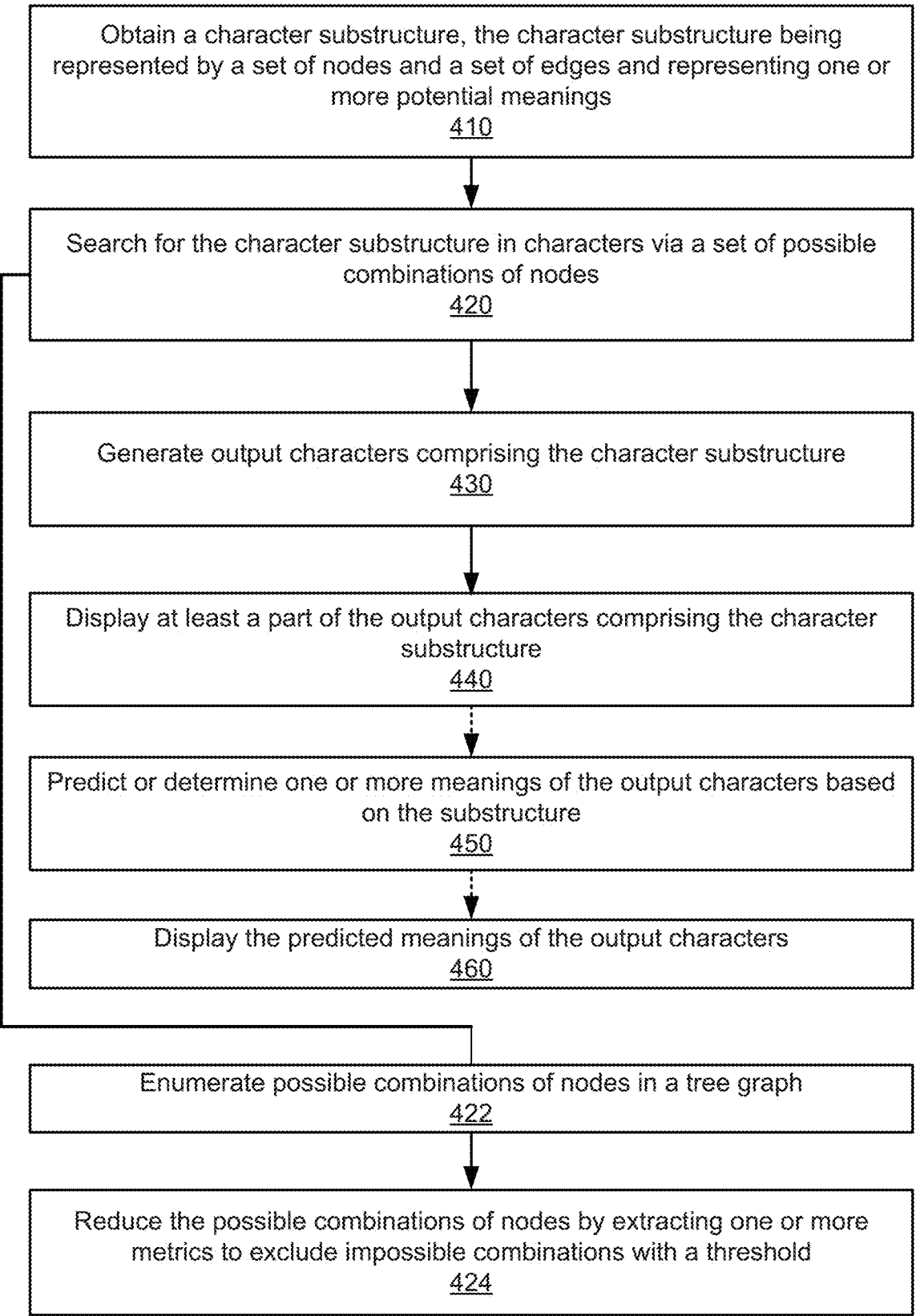

Obtain a character substructure, the character substructure being represented by a set of nodes and a set of edges and representing one or more potential meanings
410

Search for the character substructure in characters via a set of possible combinations of nodes
420

Generate output characters comprising the character substructure
430

Display at least a part of the output characters comprising the character substructure
440

Predict or determine one or more meanings of the output characters based on the substructure
450

Display the predicted meanings of the output characters
460

Enumerate possible combinations of nodes in a tree graph
422

Reduce the possible combinations of nodes by extracting one or more metrics to exclude impossible combinations with a threshold
424

FIG. 4

女 字 2867 668 definitions

乃 字 282 59 definitions

由 字 264 70 definitions

甘 字 122 26 definitions

卯 字 130 23 definitions

乖 字 146 46 definitions

方 字 950 280 definitions

勿 字 278 44 definitions

FIG. 6

Graph representation

- Graph is a collection of nodes and edges
- Graph is much more compact than images.
- Nodes and edges express structural information more directly than pixels Graph
9 nodes + 8 edges (9 + 8) x 2
= 34 values Image with
sufficient resolution 100 x 100
= 10, 000 values 乳 data breakdown

| Procreation | Utilization | Deprecation |
| --- | --- | --- |
| Pregnant/Breast/Baby/Milk | Thing to eat, use, or enjoy | Negative/Violent |
| 29 | 20 | 9 |

+ 223 undefined = 282 total characters

= 59

Helping a new learner predict probability of meaning when seeing a substructure present in a Hanzi character, in this case, 乳, is one potential use of the HanziFinder tool.

FIG. 9B

| Number | Unicode | Character | Definitions |
|---|---|---|---|
| 1 | \U5B55 | 孕 | be pregnant, pregnancy |
| 2 | \U36BA | 㚺 | (non-classical form of 孕) to be pregnant; to conceive |
| 3 | \U5C15 | 尕 | small (used in place names) |
| 4 | \U5976 | 奶 | milk; woman's breasts; nurse |
| 5 | \U4C46 | 鱮 | (same as 鱺) small fish, spawn, or roe, frog group |
| 6 | \U83BB | 芲 | late |
| 7 | \U42FC | 緞 / 繝 | slow; leisurely; to delay; to slacken; silk ribbons |
| 8 | \U46AE | 訝 | thicker, heavy, still; yet |
| 9 | \U7593 | 疓 | fatigued; (Cant.) paralysis of the foot |
| 10 | \U793D | 祋 | blessings, happiness |
| 11 | \U6C16 | 氝 | neon |
| 12 | \U76C8 | 盈 | fill; full, overflowing; surplus |
| 13 | \U3766 | 叆 | to accumulate; to amass; to store up, superior, handsome, refined, eminent (corrupted form) to make a profit on sell and buy; the profit in business, (interchangeable 贏) a [sic] overplus [sic]; gain; profit; abundance |
| 14 | \U3689 | 叅 | heap; buttress; battlements |
| 15 | \U579C | 垜 | hide; avoid |
| 16 | \U8EB1 | 躱 | (a variant of 儁) superior, handsome, refined, eminent |
| 17 | \U347A | 儁 | superior, outstanding, talented |
| 18 | \U96BD | 雋 | then; really, indeed; as it turned out, after all; namely |
| 19 | \U4E43 | 乃 | yet, still, as ever; again; keep –ing [sic], continuing |
| 20 | \U4ECD | 仍 |  |

FIG.10A

| Number | Unicode | Character | Definitions |
|---|---|---|---|
| 21 | \U643A | 搋 | lead by hand, take with; carry |
| 22 | \U3A57 | | (non-classical form of 攜) to lead by the hand, to conduct to; to take with |
| 23 | \U8A98 | | persuade, entice, induce; guide |
| 24 | \U8BF1 | | persuade, entice, induce; guide |
| 25 | \U900F | | penetrate, pass through |
| 26 | \U47AC | | (same as 透) to pass through, to let out; to let through |
| 27 | \U20BA8 | | (Cant.) to tie, tow; bring along |
| 28 | \U3A15 | | to shoulder; to take on the shoulder; to take upon oneself |
| 29 | \U36C6 | | to speculate; to conjecture; to assume; to make an intelligent guess; to fathom, (of a woman) beautiful, used in girl's name |
| 30 | \U37A7 | | (ancient form of 會) to meet, to gather, to be able, to understand |
| 31 | \U9F10 | | incense tripod |
| 32 | \U6979 | | column, pillar; numerary adjunct |
| 33 | \U3DEA | | (a variant) fat, rich, a stew of fish |
| 34 | \U442A | | (same as standard form 䐡) fat; rich, a stew of fish |
| 35 | \U4127 | | a kind of grain |
| 36 | \U82BF | | grass which has been cut and regrown; wild grass |
| 37 | \U3EB1 | | a kind of jade |
| 38 | \U7407 | | coarse variety of jasper or jade |
| 39 | \U3EEA | | a kind of jade (same as 璇 璿) fine jade |
| 40 | \U3B41 | | a kind of tree, a kind of lumber used to stop a carriage |

FIG. 10B

| Number | Unicode | Character | Definitions |
|---|---|---|---|
| 41 | \U3C8C | 犭巴 | dog's hair |
| 42 | \U79C0 | 秀 | ear of grain; flowering, luxuriant; refined, elegant, graceful |
| 43 | \U44B3 | 朵 | (same as U+6736 朵) a flower; a cluster of flowers; a bud, lobe of the ear |
| 44 | \U6736 | 朵 | cluster of flowers; earlobe |
| 45 | \U7D89 | 綉 | embroider; embroidery; ornament |
| 46 | \U7EE3 | 绣 | embroider; embroidery; ornament |
| 47 | \U954C | 鐯 | engraving tool, carve, engrave |
| 48 | \U93B8 | 锗 | engraving tool; carve, engrave |
| 49 | \U3D6C | 淵 | Used in a person's name |
| 50 | \U5234 | 剁 | chop by pounding, mince, hash |
| 51 | \U8DE5 | 跺 | stamp feet |
| 52 | \U414E | 异 | different; to distinguish |
| 53 | \U4BEE | 髳 | disheveled hair |
| 54 | \U6224 | 戗 | to infringe a trade-mark to pledge an article |
| 55 | \U83A0 | 莠 | weeds, tares; undesirable, evil |
| 56 | \U92B9 | 銹 | rust, corrode |
| 57 | \U9508 | 锈 | rust, corrode |
| 58 | \U6254 | 扔 | throw, hurl; throw away, cast |
| 59 | U+22B46 | 拻 | to draw out; to levy; to strike |
| 60 | \U8FB8 | 辺 | No definition given |

SYSTEMS AND METHODS FOR REPRESENTING AND SEARCHING CHARACTERS

CROSS REFERENCE TO RELATED APPLICATIONS

This application claims priority to U.S. Provisional Application No. 63/286,266, filed on Dec. 6, 2021. The foregoing application is incorporated by reference herein in its entirety and for all purposes.

BACKGROUND

In a written language system that includes symbols or characters, some characters can be complex and challenging to understand. Thus, methods and supporting systems that can represent characters are needed for learners to use, search, learn, or understand the language efficiently.

SUMMARY

Many written language systems are logograms, in which a symbol or a character that visually represents the units of a spoken language represents a word or a phrase. Such language systems can include a large number of individual characters, and searching for a particular character among these characters can be challenging and time consuming. Chinese characters (also known as "Hanzi," or Han characters) use symbols and are one of the earliest forms of written language in the world, dating back approximately five thousand years. Many Hanzi characters are considered to have two substructures (or components) including a radical component and a phonetic component. The radical component usually refers to a substructure that has a meaning. The phonetic component refers to additional substructures that may have a meaning or may have no meanings.

Disclosed herein are methods, systems, and technique for representing characters (or a component thereof) to generate a database (e.g., a digital database) including searchable and/or decomposable representation of characters. In some embodiments, the methods include obtaining a raster image of a character (or a component thereof), and representing the character (or a component thereof) as nodes and edges (or lines) in a graph (e.g., a two-dimensional graph). In some embodiments, the database includes at least 80,000 searchable and decomposable characters. In some embodiments, the method and/or systems can be used to represent a target structure and/or other parts of the character.

Further disclosed herein are methods, systems, and techniques for searching characters (or a component thereof) and generating output data including characters that contain the same substructure or component. In some embodiments, the output data includes digital documents (e.g., spreadsheets, EXCEL documents, or other digital documents) such as a list of sorted characters that have at least one common substructure. Advantageously, searching the substructures in this manner enables searching, sorting, and/or clustering of a plurality of Chinese characters with significantly reduced time as compared to traditional methods of searching characters (e.g., searching character by character).

Further, the systems and methods as described herein provide and predict meanings of the substructure in the sorted characters. In some embodiments, the substructure may represent the same or different meanings in the plurality of characters. Accordingly, semantic probability maps of the substructure can be generated.

Advantageously, the systems and methods as described herein have the following benefits or uses: 1) help language learners memorize vocabulary with improved efficiency and efficacy; 2) help non-native users acquire and retain a target language by creating semantic probability maps of substructures; 3) help research the meaning of substructures by studying a group of characters; 4) understand the relationship of structures to meaning in characters; 5) searching any component of the character, from as small as one stroke, to as large as an entire character; and 6) generating a large percentage of the characters containing a given substructure, such as examples shown in FIG. 6.

Disclosed herein is a method for representing a character, comprising: obtaining an image of the character, labelling a structure of the character by identifying a plurality of nodes and a plurality of edges within the character in the image, and generating a representation of the character comprising a set of two-dimensional coordinates to represent the plurality of nodes and a matrix representing the plurality of edges, wherein each of the plurality of nodes is positioned at a stroke ending or a joint of the character, and wherein each of the plurality of edges is positioned at a line between two nodes connected in the character.

In some embodiments, the character comprises a logogram.

In some embodiments, the image comprises a raster image.

Additionally disclosed herein is a method for searching characters in a database, comprising: obtaining a character substructure, the character substructure being represented by a set of nodes and a set of edges and representing one or more potential meanings, searching for the character substructure in the characters via possible combinations of nodes, generating output characters comprising the character substructure; and displaying at least a part of the output characters comprising the character substructure.

In some embodiments, the method further comprises predicting one or more meanings of the output characters based on a meaning of the character substructure.

In some embodiments, the method further comprises displaying the one or more predicted meanings of the output characters.

In some embodiments, searching for the character substructure in the characters using a set of possible combinations of nodes further comprises: enumerating a set of possible combinations of nodes in a tree graph, and reducing the set of possible combinations of nodes by extracting one or more metrics to exclude impossible combinations with a threshold.

In some embodiments, the one or more metrics comprise at least one of node branch diff, connectivity diff, posture diff, and/or inter-component diff.

Additionally disclosed herein is a system for searching characters in a database, comprising: one or more processors, and a memory coupled with the one or more processors, wherein the processor executes a set of stored computer instructions, that when executed: obtain a character substructure, the character substructure being represented by a set of nodes and a set of edges and representing one or more potential meanings, search for the character substructure in the characters using a set of possible combinations of nodes, generate output characters comprising the character substructure; and display at least a part of the output characters comprising the character substructure.

In some embodiments, the one or more characters comprise at least 80,000 characters.

Additionally disclosed herein is a method of predicting a meaning of a character, comprising: obtaining an image of the character, identifying a substructure within the character based at least in part on a plurality of nodes and a plurality of edges of the character in the image, generating a data set comprising predicted meaning of the character based on one or more meanings of the substructure.

In some embodiments, the method further comprises: displaying the data set comprising the predicted meaning of the character.

In some embodiments, the one or more meanings of the substructure is obtained from a database.

BRIEF DESCRIPTION OF DRAWINGS

FIG. 4 illustrates a flow process of searching for a substructure in one or more characters, in accordance with some embodiments as described herein;

FIG. 6 illustrates example results including a list of characters that include a common substructure and numbers of definitions of the characters;

FIGS. 9-10 illustrate example results obtained from substructure search.

DETAILED DESCRIPTION

As described herein, the disclosed embodiments of this application include techniques and supporting systems for 1) generating representation (e.g., graphical representation) of character (or a component thereof), 2) graph-based searching of characters (or a component thereof), and/or 3) predicting meanings of characters (or a component thereof).

Representation of Characters

In one aspect, characters are represented as one or more structures and substructures. In particular embodiments, the character is a logogram, a logograph, or lexigraph. In some embodiments, the representation of characters are searchable and/or decomposable. In some embodiments, the representation of characters can be stored in a database for subsequent searching and retrieval.

Figure 1B:
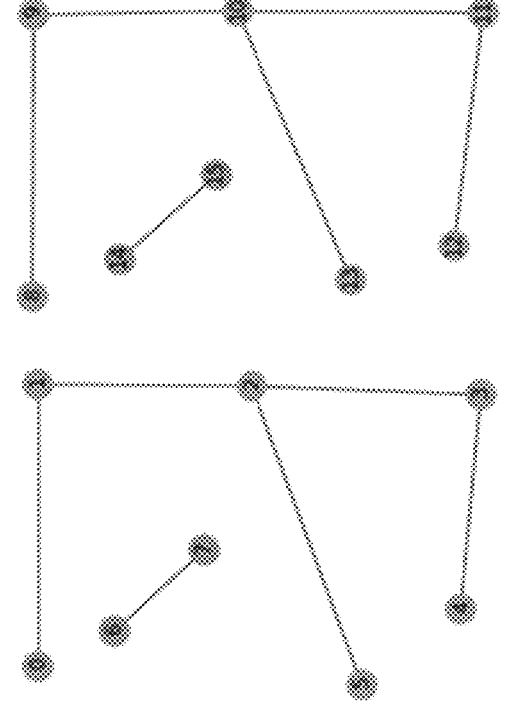
FIG. 1B illustrates a graphical representation of the character as shown in FIG. 1A, including nodes and edges, in accordance with some embodiments as described herein.
Figure 1A:
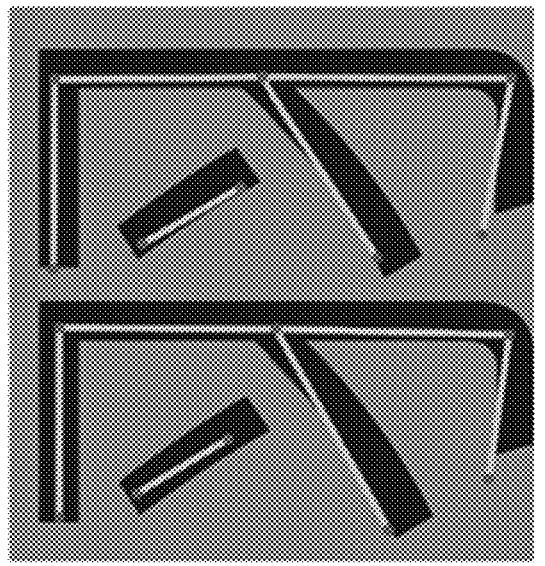
FIG. 1A illustrates a raster image of a character, in accordance with some embodiments as described herein.

In general, an image (e.g., a raster image) of the character is obtained, as shown in FIG. 1A, and a representation of the character is generated from the image of the character by labelling and/or defining the structure of the character using nodes and edges in a graph (e.g., a two-dimensional graph), as shown in FIG. 1B.

In some embodiments, the image of the character is obtained from external resources (e.g., HanaMin fonts). In some embodiments, the image of the character is obtained from a database.

In some embodiments, a node is identified and/or positioned at each stroke (e.g., line segment, or line) ending and/or each joint (point at which a line diverges) of the character. In some embodiments, an edge is identified and/or positioned at each line between two nodes that are connected in the character. Further, the nodes can be represented by a set of two-dimensional coordinates, and the edges can be represented by a matrix (e.g., an adjacent matrix). Accordingly, the structure of the character can be represented by a set of two-dimensional coordinates and a matrix.

Referring to FIGS. 1A and 1B, a raster image of the character is obtained (FIG. 1A), and the structure of the character is labelled by positioning nodes and edges that are present in the character. For example, the nodes are positioned at each stroke ending (e.g., nodes 0, 4-8, 12-15, etc. and/or joints 1-3, 9-11, etc. in FIG. 1B) present in the character, and the edges are positioned between two nodes to represent each line that match the connectivity information (e.g., a line, a curve, or other connectivity information) of the character.

As shown in FIG. 1B, the substructure is represented by 12 nodes (e.g., nodes 0-5 and 8-13). In some embodiments, a substructure may have fewer or more nodes and/or represent a larger or smaller portion of the overall character depending on the structure.

Once the character is labeled, a representation of the structure of the character can be generated by extracting a set of nodes $N=\{(x1,y1), (x2,y2), \ldots (xn,yn)\}$ to represent the nodes labelled for the character, and by extracting an N×N adjacent matrix A to represent the edges labelled for the character, as shown in FIG. 1B. Accordingly, the structure of the character in a two dimensional graph can be represented by a data set including the set of nodes N and the adjacent matrix A.

In general, a database used to store the representations (e.g., graphical representations) of the characters. In some embodiments, the database includes a number of characters that ranges from about 10,000 to about 100,000 characters. In some embodiments, the database includes at least 80,000 characters.

In some embodiments, the database can be used for searching substructures and/or characters, as described below in further detail.

Searching for Characters

In another aspect, a search tool, a search algorithm, and/or a search method may be used to search for characters.

In general, input data including a substructure is provided to a search tool. The search tool may identify the substructure provided by the input data, and generate one or more characters that include the same substructure by performing substructure searching through a plurality of characters.

In some embodiments, the substructure searching is performed in a database. In some embodiments, the substructure searching is performed in an external resource.

In particular embodiments, the input data is obtained from a typeface database. In some embodiments, the characters in the input data include connectivity information. In some embodiments, the characters in the input data does not include connectivity information.

In some embodiments, the input data includes a raster image of a character and/or a substructure (e.g., FIG. 1A). Accordingly, a graphical representation of the character may be generated using the method of graphical representation as described above, and provided to the search tool.

In general, the search tool can implement searching of a substructure through graphical representations of characters (e.g., FIG. 1B), and generate output data that includes characters that include the substructure.

In some embodiments, the search tool searches through the graphical representations of characters by looking for possible combinations of nodes and/or edges that match the substructure. In various embodiments, the possible combination of nodes include the same number of nodes as the number of nodes representing the substructure. In some embodiments, the possible combinations of the nodes in each character may be enumerated in a tree graph or a tree manner (e.g., FIG. 8B).

The search tool may search a reduced number of possible combinations of the nodes by implementing one or more metrics to exclude impossible combinations with a threshold (e.g., a heuristic threshold). In some embodiments, the metrics comprises "node branch diff," "connectivity diff," "posture diff," and/or "inter-component diff," as described in further detail in FIGS. 8C-8F.

The search tool may also implement metrics such that various drawing styles for a character can be recognized. For example, the search tool may implement a metric that focuses on connectivity. In another example, the search tool may implement a metric that focuses on posture (e.g., pair-wise relative direction from one node to another node). In some embodiments, higher weights are assigned to metrics focusing on posture than on metrics focusing on connectivity. Thus, substructures with low similarity in connectivity but high similarity in posture, which may be resulted from the different drawing styles, can be considered by the search algorithm. In some embodiments, lower weights are assigned to metrics focusing on posture than on metrics focusing on connectivity.

In some embodiments, the output data includes a plurality of top-matching characters. In some embodiments, the output data is displayed as a list of characters starting from the best-matching character (e.g., a character that includes the best combinations of metrics and minimum differences from the substructure) to the next best-matching character, etc.

A selected number of characters, structures, and/or substructures (e.g., the top-matching characters and/or a component thereof) may be displayed e.g., on a character list. For example, the output data may be displayed as a character list starting from the best-matching character to the next best-matching character etc., until the number of characters that are displayed on the character list reaches a threshold (e.g., a number that is previously selected by the user).

Figure 2:
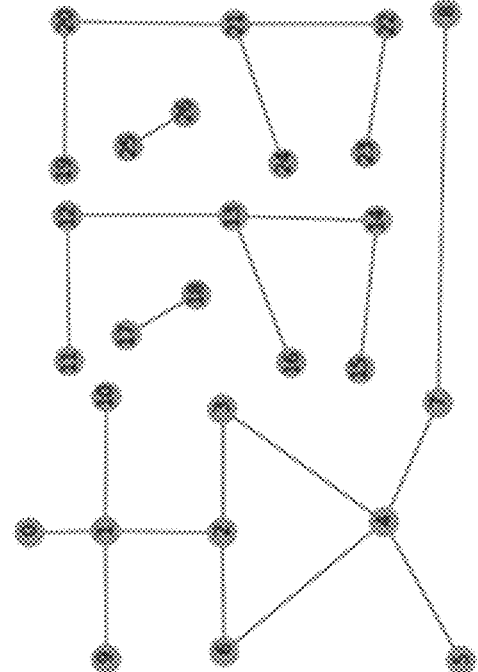
FIG. 2 illustrates a graphical representation of a character including nodes representing a substructure as shown in FIGS. 1A-1B and additional nodes representing another substructure, in accordance with some embodiments as described herein.

Referring to FIGS. 1-2, in general, the search tool can perform searching of a target substructure (e.g., substructure in FIG. 1B) through characters (e.g., the character in FIG. 2).

Referring again to FIG. 2, the character that is analyzed by the search tool is represented by 27 nodes in a two-dimensional graph G(N_g, A_g) using the method as described above (e.g., in FIGS. 1A and 1B). As described herein, G refers to a graph, which is defined by nodes N and adjacent matrix A. N refers to nodes, and |N| refers to the number of nodes.

During the searching, the search tool can 1) identify which combination of 12 nodes representing the substructure (e.g., FIG. 1B) in the character (e.g., FIG. 2) offers the best match with the 12 nodes (e.g., nodes 0-5 and 8-13) in the character in FIG. 1B, and/or 2) determine whether the best match is good enough (e.g., meets some minimum threshold match) to be considered.

For the 27 nodes as shown in FIG. 2, the number of possible combinations of 12 nodes is (27×26×25 . . . (27-11)). The (27×26×25 . . . (27-11)) possible combinations of a graph G(N_g, A_g) can be enumerated in a tree manner, with depth=# nodes of target structure |N_t| and # branches of each node=# nodes of candidate character |N_g|, resulting in a very large tree. As described herein, subscript t refers to a target character, and subscript g refers to a specific candidate character during a substructure searching. To trim the tree of searching, one or more metrics (e.g., node branch diff, connectivity diff, posture diff, and/or inter-component diff) may be used to exclude impossible branches with a threshold (e.g., a heuristic threshold) as the tree grows. A beam search, in which only a fixed number of candidates are kept after each successive step, may also be used to reduce computation requirement.

In various embodiments, the threshold ranges from 0 to 1. Smaller values of the threshold may lead to more possible combinations to validate, and larger values of the threshold may lead to filtering of impossible cases. Multiple iterations may be run to determine an optimal value of the threshold(s) that achieves a balance between efficiency, accuracy, and inclusiveness of the search tool. A polarization metric may be defined to measure the aligning difference of pairs of nodes, such that 0 refers to the same direction, and 1 refers to the opposite direction. For example, for two candidate nodes including a first node 1' and a second node 2' on the same horizontal line, the second node 2' is located on the right of the first node 1', resulting in a direction of the edge of the two nodes 1'→2'. In this case, there may be two possible aligning arrangements including: the same direction as the direction of the edge of the two nodes 1'→2', represented by 0, and an opposite direction from the direction of the edge of the two nodes 2'→1', represented by 1.

The output data can include multiple files as described herein. The multiple files may include a text file including a list of characters that can be opened by a text software; a spreadsheet including the same list of characters as the text file, as well as information about the skeleton structure, posture, node, etc. related to the searching of each character; and one or more spreadsheets related to selections made by the user (e.g., before or during the search). In some embodiments, the output data may include a separate file for each character that has been analyzed and generated by the search tool, where each file illustrates the specific substructure in one color and the rest of the character in a different color.

The search tool may be installed in a local machine (e.g., a computer, a mobile device, etc) or accessible to a user without a need to install the search tool on a local machine. For example, the search tool can be provided to a user from a public website as a cloud-based service or platform (e.g., computing and/or storage platforms provided by Google, or other suitable platforms). In various embodiments, the search tool can include a graphical user interface (GUI).

Figure 3:
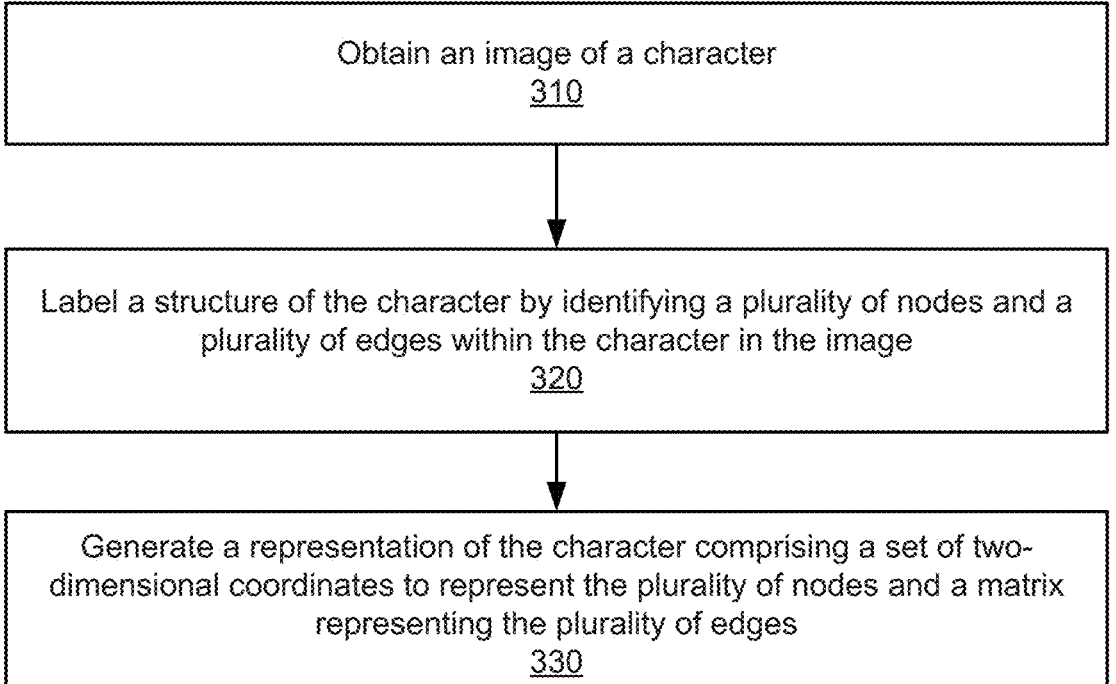
FIG. 3 illustrates a flow process of generating a representation of a character, in accordance with some embodiments as described herein.

FIG. 3 illustrates a flow process of generating a representation of a character based on an image (e.g., a raster image) of the character (e.g., characters in FIGS. 1-2). At step 310, an image (e.g., a raster image) of a character is obtained. At step 320, a structure of the character is labelled by identifying a plurality of nodes and a plurality of edges within the character in the image. At step 330, a representation of the character is generated, which include a set of two-dimensional coordinates to represent the plurality of nodes and a matrix (e.g., an adjacent matrix) to represent the plurality of edges.

FIG. 4 illustrates a flow process of searching for a substructure in one or more characters. At step 410, a character substructure represented by a set of nodes and a set of edges is obtained. In some embodiments, the character substructure represents one or more potential meanings. At step 420, the character substructure is searched (e.g., by a search tool) in characters via a set of possible combinations of nodes. In some embodiments, the search is performed by enumerating possible combinations of nodes in a tree graph (step 422 in FIG. 4) and reducing the possible combinations of nodes by extracting one or more metrics to exclude impossible combinations with a threshold (a heuristic threshold) (step 424 in FIG. 4). In some embodiments, the metrics include at least one of node branch diff, connectivity diff, posture diff, and/or inter-component diff. At step 430, output characters including the character substructure are generated. At step 440, at least a part of the output characters that includes (or matches) the character substructure is displayed. At step 450, optionally (represented by a dotted line as shown in FIG. 4), one or more meanings of the output characters are determined or predicted, e.g., based on the substructure (e.g., a meaning, and/or geometry information of the substructure). In some embodiments, the prediction is performed and provided using a search tool, a search algorithm, or a search method as described herein. At step 460, optionally, the predicted meanings of the output characters are displayed (e.g., as a pie chart in FIG. 9C). Such displayed results may, for example, enable a user to learn the characters in groups based on the meanings efficiently.

Figure 5:
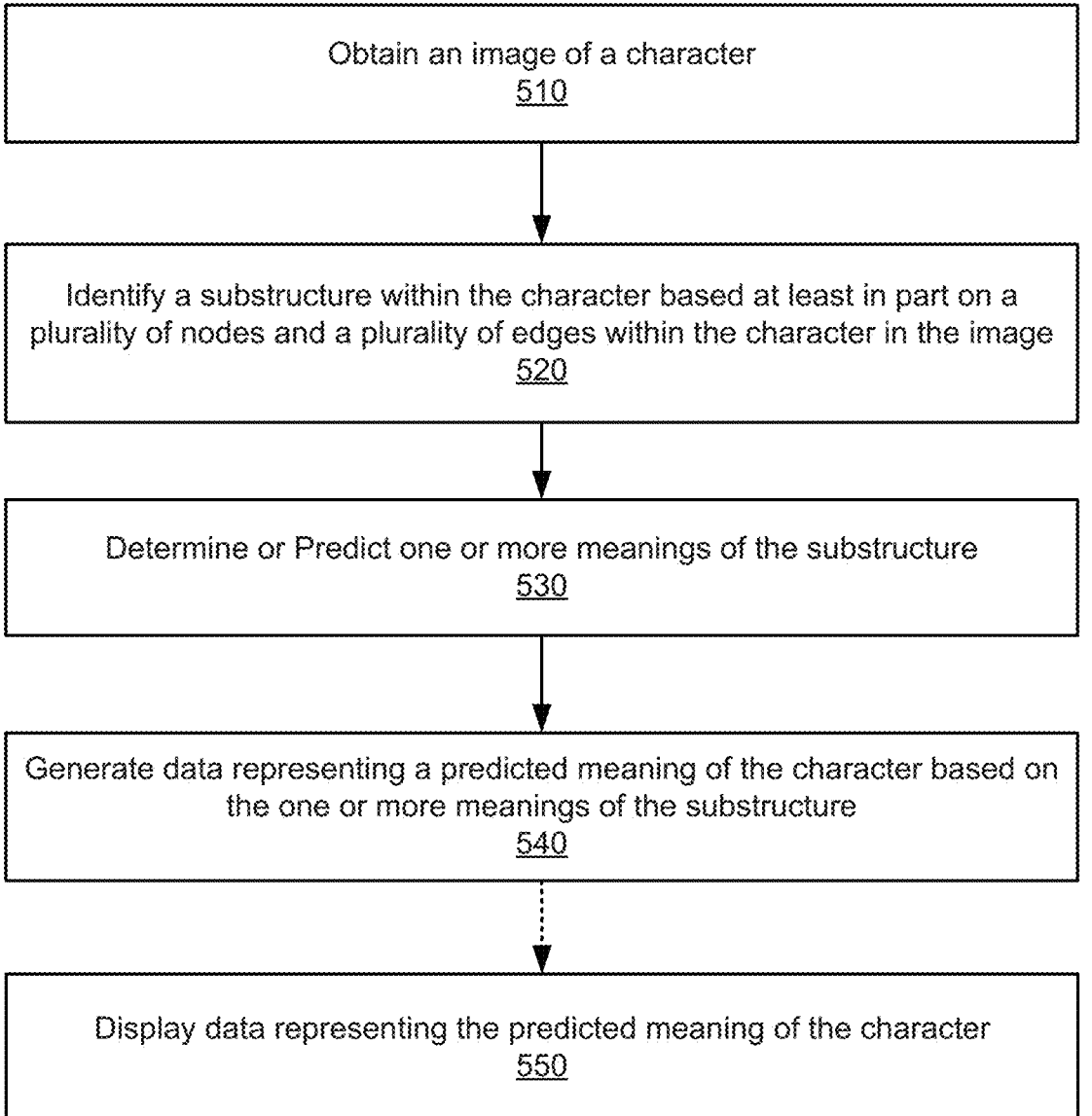
FIG. 5 illustrates a flow process of predicting a meaning of a character based on a substructure of the character, in accordance with some embodiments as described herein.

FIG. 5 illustrates a flow process of predicting a meaning of a character based on a substructure of the character. At step 510, an image (e.g., a raster image) or a graph of a character is obtained. In some embodiments, the image or the graph of the character is obtained from a database. In some embodiments, the image or the graph of the character is obtained form an external resource. At step 520, a substructure of the character is identified based at least in part on a plurality of nodes and a plurality of edges within character in the image. At step 530, one or more meanings of the substructure are predicted or determined. At step 540, data representing a predicted meaning of the character based on one or more meanings of the substructure are generated. In some embodiments, the meanings of the substructure is obtained from a database. At step 550, optionally, data representing the predicted meaning of the character is displayed.

Example 1: Example Lists of Characters Generated by the Search Tool

FIG. 6 illustrates example results including a list of characters that include a common substructure and numbers of definitions of the characters.

As shown in FIG. 6, the first column illustrates example substructures for search in a database including a plurality of characters using the search tool as described herein. The second column illustrates results generated from the search tool, including the number of characters that contain the substructure. The fourth columns also illustrate results generated from the search tool, including the number of definitions associated with the characters in the same row on the second column.

More specifically, as shown in the first row in FIG. 6, the search tool provides 2867 characters that include the substructure " 女" and there are at least 668 definitions provided for these characters. As shown in the second row in FIG. 6, the search tool provides 282 characters that include the substructure "乃," and there are at least 59 definitions provided for these characters. As shown in the third row in FIG. 6, the search tool provides 264 characters that include the substructure "母," and there are at least 70 definitions provided for these characters. As shown in the fourth row in FIG. 6, the search tool provides 122 characters that include the substructure "丑," and there are at least 26 definitions provided for these characters. As shown in the fifth row in FIG. 6, the search tool provides 130 characters that include the substructure "卯," and there are at least 23 definitions provided for these characters. As shown in the sixth row in FIG. 7, the search tool provides 146 characters that include the substructure "青," and there are at least 46 definitions provided for these characters. As shown in the seventh row in FIG. 6, the search tool provides 950 characters that include the substructure "彡," and there are at least 280 definitions provided for these characters. As shown in the eighth row in FIG. 6, the search tool provides 278 characters that include the substructure "豸," and there are at least 44 definitions provided for these characters.

Example 2: Example Graphical Representation and Substructure Search for a Particular Substructure "乃"

FIGS. 8-10 depict example systems, methods, and results associated with a particular substructure "乃" (the substructure shown in the second row in FIG. 7).

Many characters are considered to have two substructures (or components) such as a radical component and a phonetic component. The radical component may be a substructure that has a meaning. The phonetic component may include a meaning or may include no meaning. If the phonetic component is a substructure that conveys a meaning, the systems and methods as described herein may facilitate new research and new method development for language acquisition.

The systems and methods as described herein can determine whether the phonetic component or any substructure of a Chinese Hanzi character has a meaning or has an influence to the meaning of the character.

In this example, a substructure " 乃" was a target structure for generating graphical representation, and a list of characters containing " 乃"

Example 2.1: Example Representation Of Substructure " 乃"

Figure 7A:
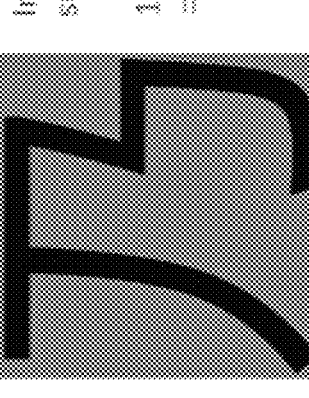
FIGS. 7A and 7B illustrate example representation of a substructure obtained from a raster image.
Figure 7B:
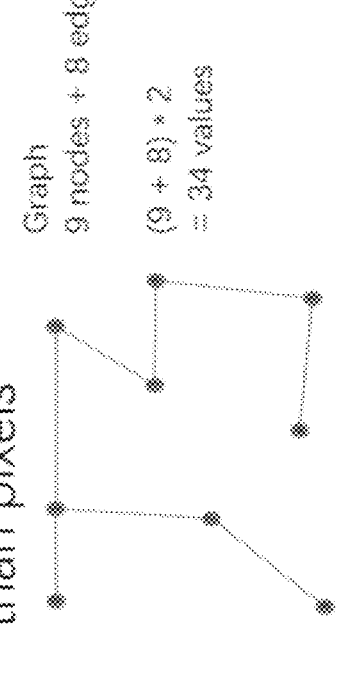

For example, as shown in FIG. 7A, substructure " 乃" is represented by 9 nodes and 8 edges (or lines as described herein). Accordingly, there are (9+8)×2=34 values generated for a graphical representation of this substructure, and saved in the database. In comparison, as shown in FIG. 7B, an image of this substructure, e.g., with sufficient resolution for a general user, may include 100×100 values.

Example 2.2: Example Searching for Substructure "J3"

Figure 8A:
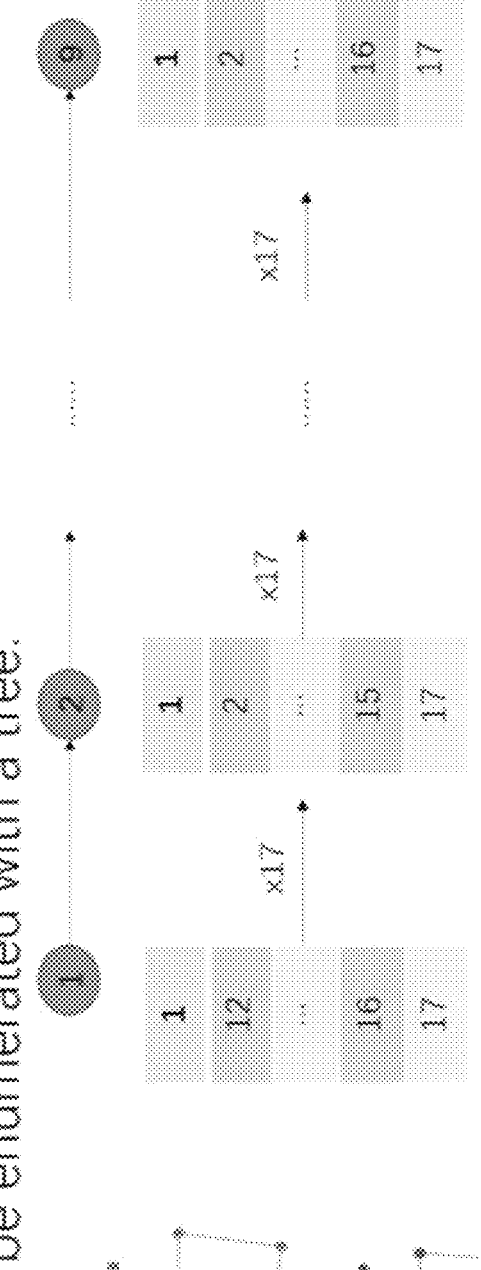
FIGS. 8A-8F illustrate example character searching processes.
Figure 8B:
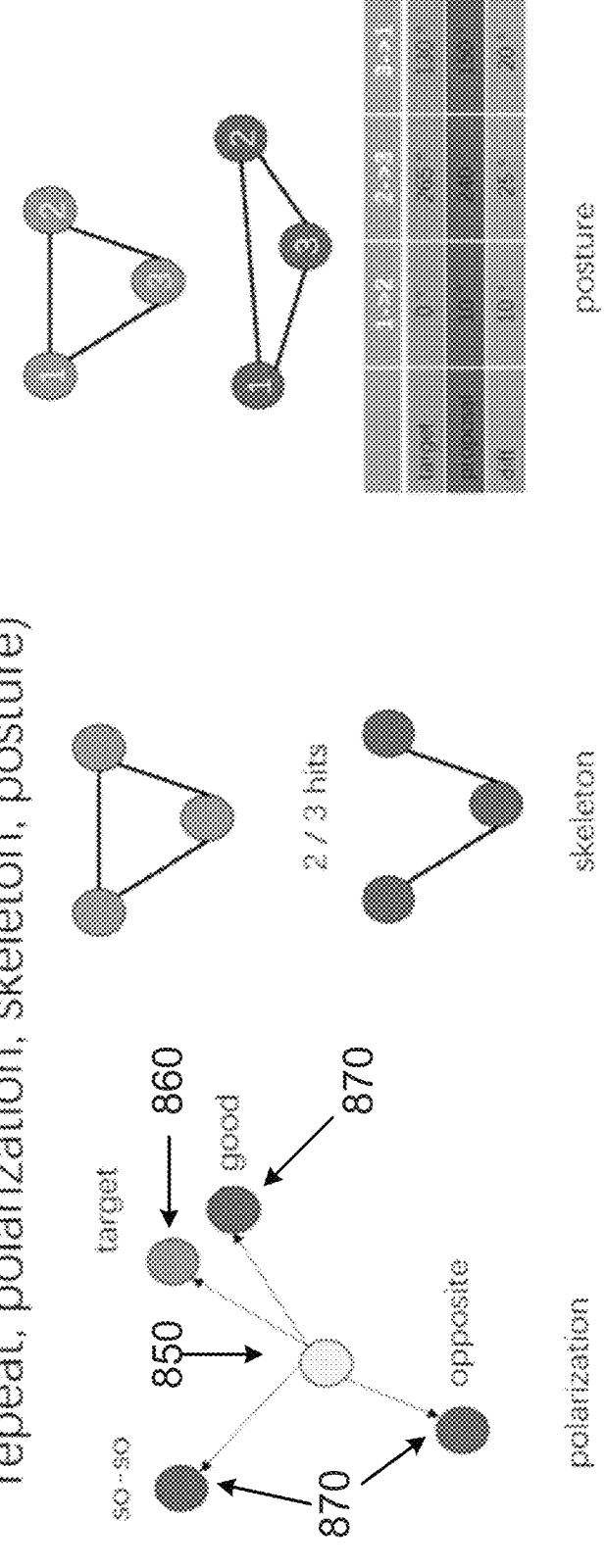

Referring to FIGS. 8A and 8B, once a graphical representation of the character is obtained or generated, a subgraph search can be conducted by implementing a node selection process using a graph based (e.g., graphical representation as described herein) substructure searching algorithm. In some cases, the node selection process was enumerated with a tree structure.

As shown in FIG. 8A, a substructure 810 " 乃 " includes 9 nodes, and a character 820 " 奶 " includes 17 nodes including the substructure 810 " 乃 " that has 9 nodes and additional 8 nodes. Accordingly, the substructure search in this case includes searching of each node of the substructure, and for each step, there are 17 nodes to be considered, resulting in the number of possibility to search to be 17 to the power of 17, i.e., about 118 trillion. To reduce these large number of searches, several metrics were developed to prune unlikely branches (e.g., "no-repeat," "polarization," "skeleton," and/or "posture") in a decision tree, as shown in FIG. 8B and also described above for FIG. 2.

More specifically, as shown FIG. 8B, the element 850 refers to a structure of a character (e.g., character 820 in FIG. 8A), the element 860 refers to a target structure (e.g., the substructure 810 in FIG. 8A), and the element 870 refers to a structure that is not the target structure. In some cases, the element 860 include elements in "polarization" and/or "posture" branch, as shown in FIG. 8B. In some cases, the element 870 are named as "so-so," "opposite," and/or "good" in "polarization" branch in FIG. 8B, and/or elements in "skeleton" branch, and/or "posture" branch. By implementing the search tool, the target substructure (e.g., element 860) may be searched in a character structure (e.g., element 850) to identify whether the character structure includes the target structure.

Figures 8C, 8D, 8E, 8F:
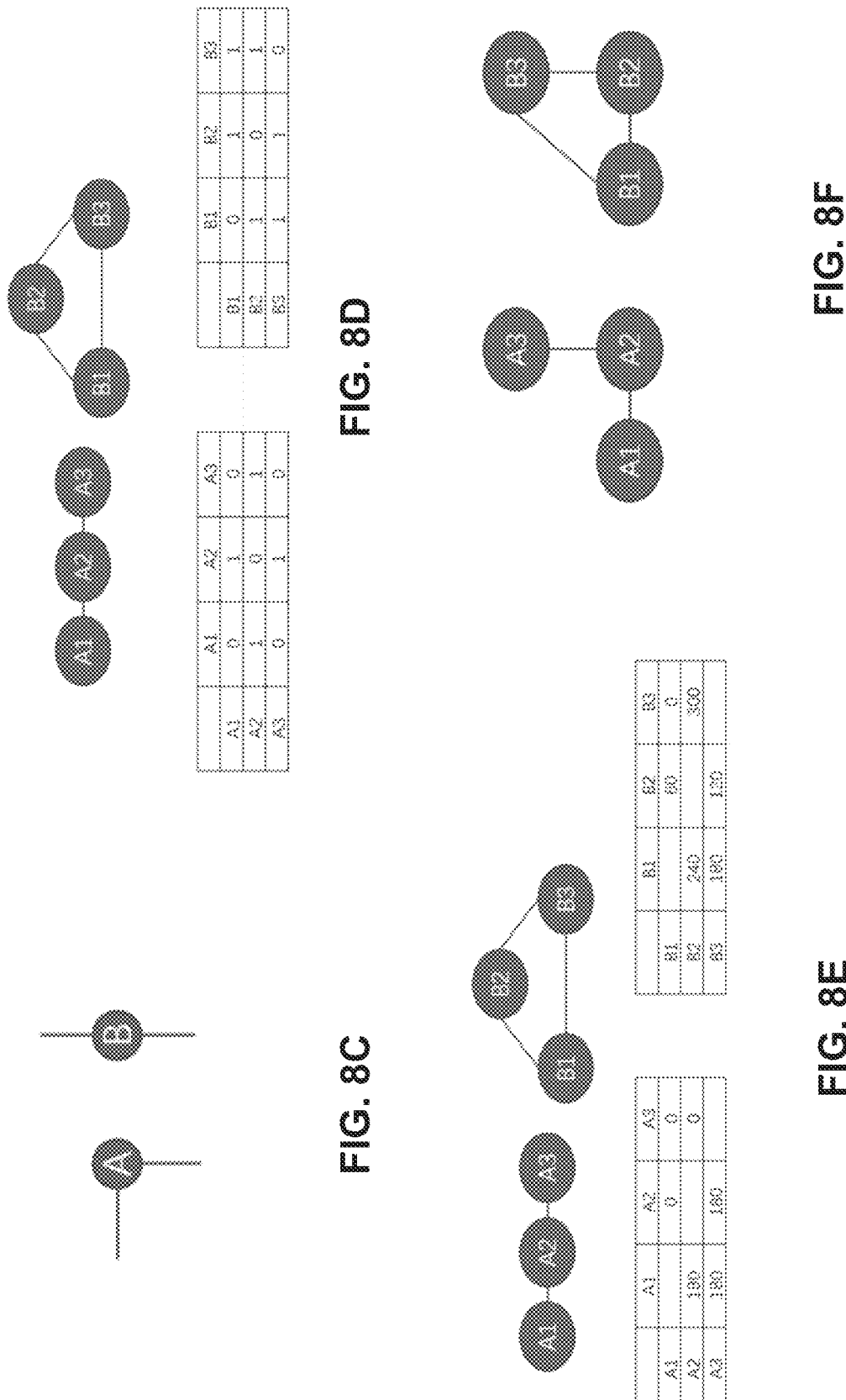

FIGS. 8C-8E illustrate example metrics implemented in the search tool. For example, the metrics include node branch diff, connectivity diff, posture diff, and/or inter-component diff, as described below in further detail.

In general, the search tool searches possible combinations of nodes and/or edges to identify combinations of nodes and/or edges that are similar to the substructure. For example, a combination of nodes and/or edges that are similar to the substructure may match or include a target substructure that was searched for by the search tool. In some emobdiments, the search tool applies (e.g., extracts) one or more metrics, where the metrics measure different types of similarities (or differences). In the search tool, the difference ("diff") and similarity ("sim") may be be correlated as: diff+sim=1.

Advantageously, the application of metrics in a search tool can 1) trim branches or combinations that are unlikely to be a good match and 2) rank output data from the same layer of the tree. Accordingly, the search may be more effective and efficient as compared with searching without using the metrics.

In some embodiments, the "node branch diff" focuses on angle distribution of branches extented from one node, and thus represents a feature for a single node. For example, as shown in FIG. 8C, the node A's branches could be characterized as [180°, 270°], and the node B's branches could be characterized as [90°, 270°]. The similarity ("sim") between node A and node B may be defined as an inner product of normalized length distribution along the circle, and the difference ("diff") can obtained as: diff=1−sim.

In some embodiments, the "connectivity diff" focuses on overlap of matries (e.g., adjacent matrixes). For example, as shown in FIG. 8D, each cell in an adjacent matrix is characterized as a binary singal, and the similarity can be defined as balance between recall and precision. In some cases, F1 score is used for simplicity.

In some embodiments, the "posture diff" focuses on overlap of node-node angle table. For example, as shown in FIG. 8E, the difference ("diff") in this scenario is defined as root mean square error (RMSE) of two tables.

In som embodiments, the "inter-component diff" (not shown) works on the node level, and computes root mean square error (RMSE) of component-component angle table, while each component's location is represented by its mass center.

FIG. 8F illustrates an example of low connectivity similarity but high posture similarity between two characters (or a component thereof). In general, a first character (or substructure) that includes elements (e.g., nodes) A1, A2, and A3; and a second character (or substructure) that includes elements B1, B2, and B3 share the same two-dimensional coordinates, and thus have high posture similarity. In contrast, the two structures are different in their connectivitities, and thus have low connectivity similarity.

More specifically, the first character (or substructure) has two edges or lines (i.e., a line connecting elements A1 and A2, and a line connecting elements A2 and A3). The first character does not have an edge or a line between elements A1 and A3. In contrast, the second character (or substructure) has three edges or lines (i.e., a line connecting elements B1 and B2, a line connecting elements B2 and B3, and a line connecting elements B1 and B3).

One character example for the first character and the second character would be " 凹 " and " 口 " The two characters " 凹 " and " 口 " both have four nodes at each corner of the character, and thus may have high posture similiary. In contrast, the two characters do not include the same connectivities, for example, at the top portion of each character, and thus may have low connecitivity similarity. Therefore, when searching for a substructure " 口 " in a character " 凹 " the search tool may consider the character " 凹 " to have low connectivity similarity but high posture similarity with " 口 "

Example 2.3: Example Interpretation and Meanings
of Substructure " 乃 "

Figure 9A:
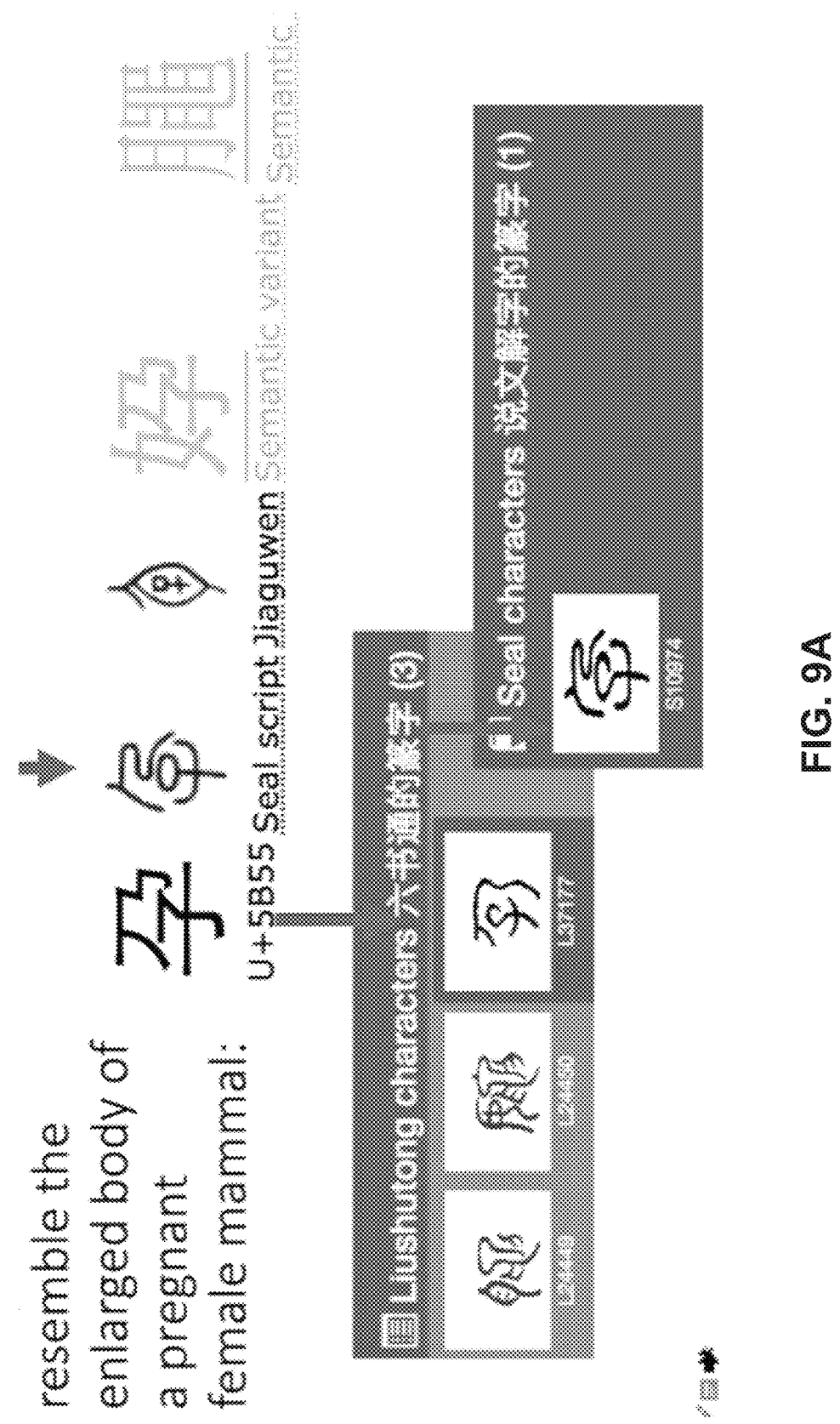

As shown in FIG. 9A, the precursors of " 乃 " from ancient forms of the characters (e.g., Liushutong characters, Seal characters, or other ancient form of characters) seem to represent an enlarged body of a pregnant female mammal. Thus, " 乃 " appears to have a correlation to procreation.

Figure 9C:
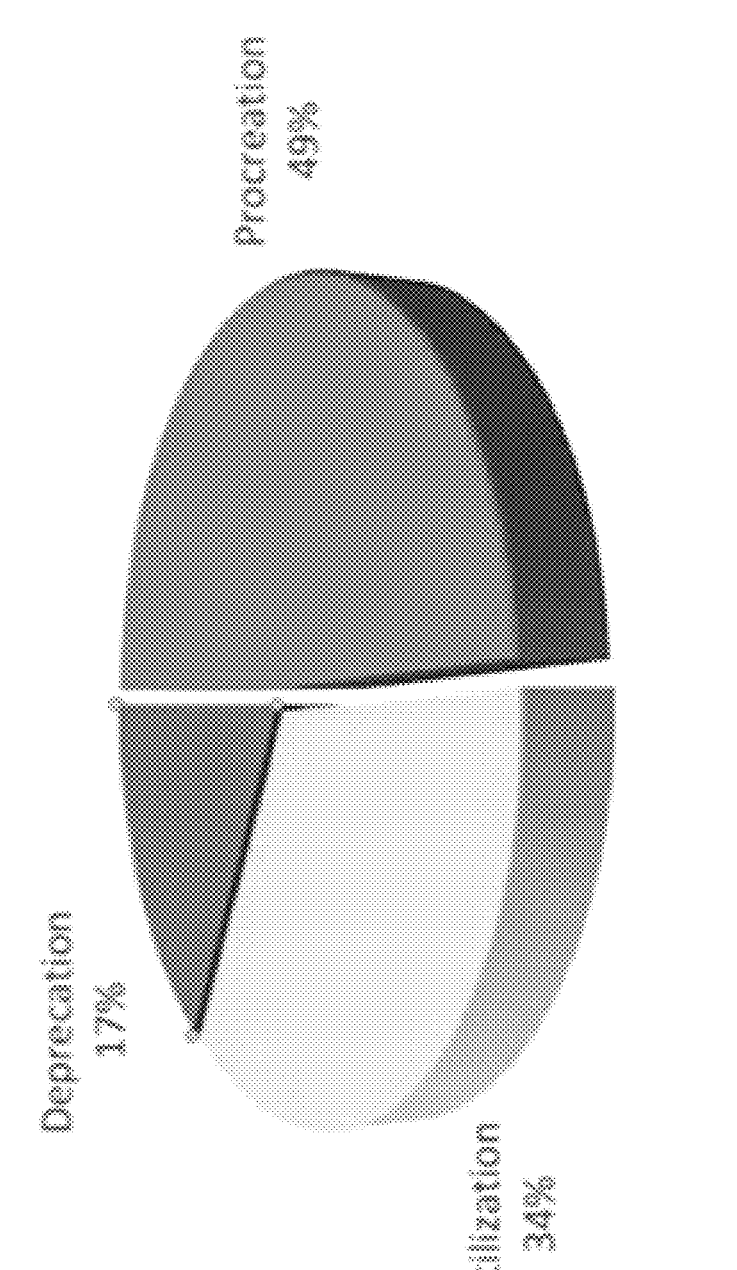

Further, as shown in FIG. 9A, the meanings of the substructure and/or the characters were analyzed. For example, the character " 孕 " includes " 乃 " and " 子 " Since " 乃 " has a correlation to procreation, as described above, and " 子 " has a meaning of child, it may be predicted that the structure of " 孕 " (e.g., a structure including a substructure " 乃 " above another substructure " 子 ") has a meaning of a child coming out of a mother's body. In fact, the meaning of " 孕 " is "pregnant." There is more than one meaning for characters that contain " 乃 " some of which are shown in FIG. 9A-9C. For example, in addition to meanings associated with procreation (e.g., pregnant, breast, baby, and/or milk), this substructure can also have meanings associated with utilization (e.g., things to eat, use, or enjoy), and meanings associates with deprecation (e.g., negative or violent).

In this example, 282 characters are found to include this substructure, as generated by the searching tool. As shown in FIG. 9B, among these characters that include this substructure as generated by the searching tool, the meanings associated with procreation appears in 29 characters, the meanings associated with utilization appears in 20 characters, and the meanings associated with deprecation appear in 9 characters, resulting in 59 characters in total.

Additionally, there are many undefined meanings for characters that contain " 乃 " In this example, 223 characters have undefined meanings, as shown in FIG. 9B.

Referring to FIGS. 9B and 9C, the probability of meaning of a character may be predicted according to a substructure present in the character by using the search tool and/or methods as described herein. Advantageously, in use, the systems and methods can help a new learner to predict probablity of meaning when seeing a substructure present in a Hanzi character, in this case, " 乃 "

FIG. 9C illustrates a semantic probability map generated by grouping and/or sorting every character with a particular substructure by their meanings, where the characters and their meanings are generated by the systems and methods as described herein (e.g., the substructure search tool and/or the substructure search methods).

For example, as shown in FIG. 9C, among the 59 characters that have defined meanings, the meanings associated with procreation appears in 29 characters (about 49% of the total 59 characters that have defined meanings); the meanings associated with utilization appears in 20 characters (about 34% of the total 59 characters that have defined meanings), and the meanings associated with deprecation appear in 9 characters (about 17% of the total 59 characters that have defined meanings). Such a probability map generated by the systems and methods as described herein (e.g., the search tool, algorithms, and/or methods) and displayed to a user, e.g., as shown in FIGS. 9B and 9C, could give clues as whether or not the phonetic or other substructures equate to meaningful elements. The map would be based upon the clustering of meaning space.

The results as shown in FIG. 9B and 9C can be applied to study the relationship between substructure and meaning, and thus can be beneficial for a user to learn (e.g., memorize) the characters.

Example 2.4: Example Results of Characters Including Substructure " 乃 "

FIGS. 10A-10C illustrate example results by implementing the substructure search as described in Example 2.1-2.3.

More specifically, a list of characters including unicode, written form of the character, and/or definitions of the characters, where each of the characters include the substructrue, are generated. For example, the first character on the list as shown in FIG. 10A is " 孕," with a unicode "/U5B55" and a definition of "be pregnant, pregnancy." As also described above, 59 characters that include substructure " 乃 " are found to have defined meanings, as listed from number 1 to number 59 on FIGS. 10A-10C. Further, there are many other characters that include the same substructure while having undefined meanings. These characters start from number 60 on FIG. 10C, and so on (shown as ellipsis ". . . " in FIG. 10C).

Further, results such as the maps as shown in FIGS. 9B and 9C can be generated based on the list of characters.

System and/or Computer Embodiments

Examples of a computing device can include a personal computer, desktop computer laptop, server computer, a computing node within a cluster, message processors, handheld devices, multi-processor systems, microprocessor-based or programmable consumer electronics, network PCs, minicomputers, mainframe computers, mobile telephones, PDAs, tablets, pagers, routers, switches, and the like.

Figure 11:
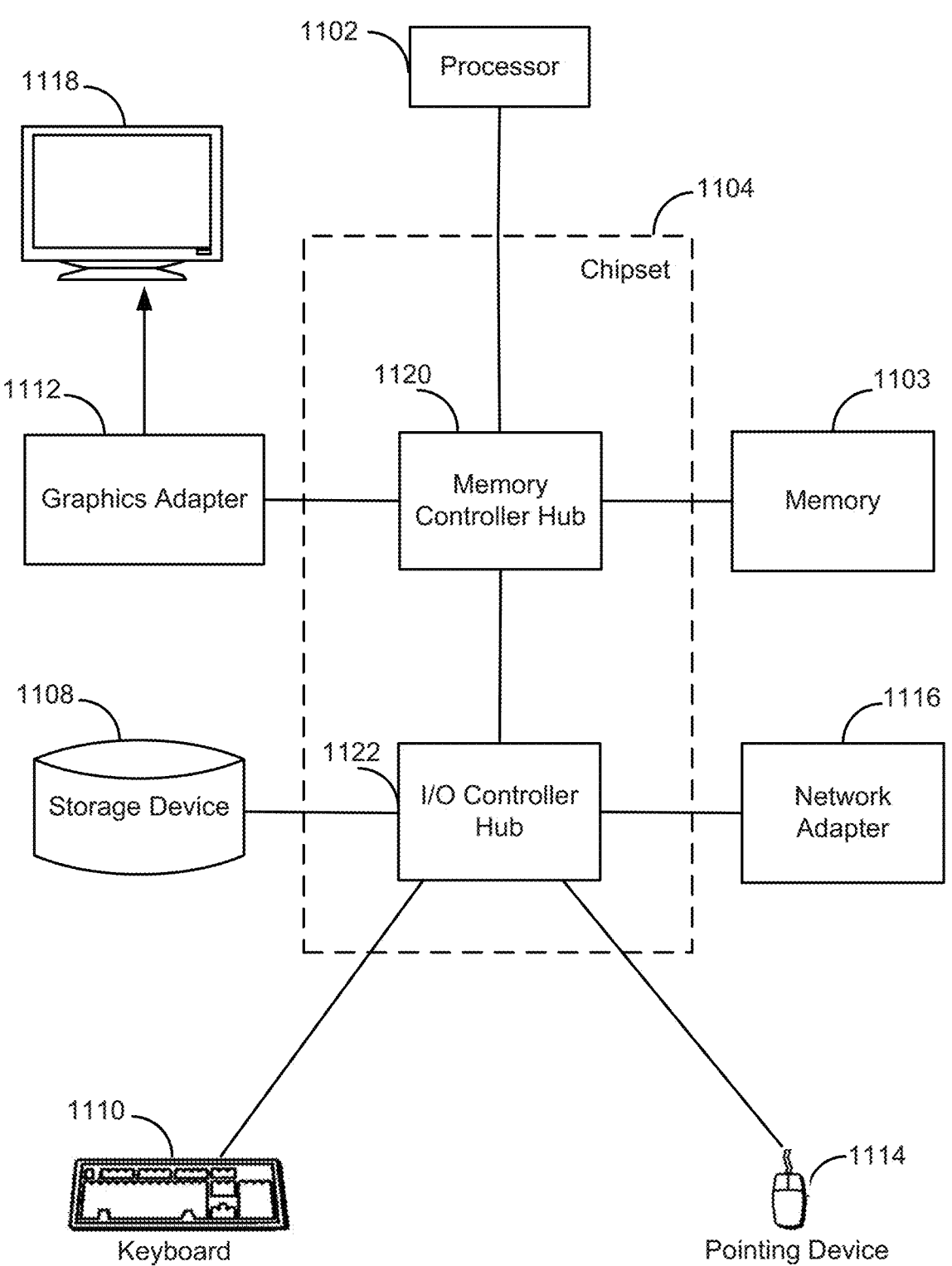
FIG. 11 illustrates an example computing device for implementing system and methods described in reference to FIGS. 1-10.

FIG. 11 illustrates an example computing device for implementing system and methods described in FIGS. 1-10. In some embodiments, the computing device includes at least one processor 1102 coupled to a chipset 1104. The chipset 1104 includes a memory controller hub 1120 and an input/output (I/O) controller hub 1122. A memory 1103 and a graphics adapter 1112 are coupled to the memory controller hub 1120, and a display 1118 is coupled to the graphics adapter 1112. A storage device 1108, an input interface 1114, and network adapter 1116 are coupled to the I/O controller hub 1122. Other embodiments of the computing device have different architectures.

The storage device 1108 is a non-transitory computer-readable storage medium such as a hard drive, compact disk read-only memory (CD-ROM), DVD, or a solid-state memory device. The memory 1103 holds instructions and data used by the processor 1102. The input interface 1114 is a touch-screen interface, a mouse, track ball, or other type of input interface, a keyboard 1110, or some combination thereof, and is used to input data into the computing device. In some embodiments, the computing device may be configured to receive input (e.g., commands) from the input interface 1114 via gestures from the user. The graphics adapter 1112 displays images and other information on the display 1118. The network adapter 1116 couples the computing device to one or more computer networks.

The computing device is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 1108, loaded into the memory 1103, and executed by the processor 1102.

The types of computing devices can vary from the embodiments described herein. For example, the computing device can lack some of the components described above, such as graphics adapters 1112, input interface 1114, and displays 1118. In some embodiments, a computing device an include a processor 1102 for executing instructions stored on a memory 1103.

In various embodiments, methods described herein, can be implemented in hardware or software, or a combination of both. In one embodiment, a non-transitory machine-readable storage medium, such as one described above, is provided, the medium comprising a data storage material encoded with machine readable data which, when using a machine programmed with instructions for using said data, is capable of displaying any of the datasets and execution and results of this invention. Embodiments of the methods described above can be implemented in computer programs executing on programmable computers, comprising a processor, a data storage system (including volatile and non-volatile memory and/or storage elements), a graphics adapter, an input interface, a network adapter, at least one input device, and at least one output device. A display is coupled to the graphics adapter. Program code is applied to input data to perform the functions described above and generate output information. The output information is applied to one or more output devices, in known fashion. The computer can be, for example, a personal computer, microcomputer, or workstation of conventional design.

Each program can be implemented in a high level procedural or object oriented programming language to communicate with a computer system. However, the programs can be implemented in assembly or machine language, if desired. In any case, the language can be a compiled or interpreted language. Each such computer program is preferably stored on a storage media or device (e.g., ROM or magnetic diskette) readable by a general or special purpose programmable computer, for configuring and operating the computer when the storage media or device is read by the computer to perform the procedures described herein. The system can also be considered to be implemented as a computer-readable storage medium, configured with a computer program, where the storage medium so configured causes a computer to operate in a specific and predefined manner to perform the functions described herein.

The signature patterns and databases thereof can be provided in a variety of media to facilitate their use. "Media" refers to a manufacture that contains the signature pattern information of the present invention. The databases of the present invention can be recorded on computer readable media, e.g. any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; and hybrids of these categories such as magnetic/optical storage media. One of skill in the art can readily appreciate how any of the presently known computer readable mediums can be used to create a manufacture comprising a recording of the present database information. "Recorded" refers to a process for storing information on computer readable medium, using any such methods as known in the art. Any convenient data storage structure can be chosen, based on the means used to access the stored information. A variety of data processor programs and formats can be used for storage, e.g. word processing text file, database format, etc.

Processors suitable for the execution of the systems and methods in the presently disclosed embodiments include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

It should also be noted that the present implementations can be provided as one or more computer-readable programs embodied on or in one or more articles of manufacture. The article of manufacture can be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The software programs can be further translated into machine language or virtual machine instructions and stored in a program file in that form. The program file can then be stored on or in one or more of the articles of manufacture.

Definition

Terms used in the claims and specification are defined as set forth below unless otherwise specified.

The term "logogram," "logograph," or "lexigraph" refers to a symbol or a written character that visually represents the units of a spoken language, a word, or a phrase.

The term "raster image" or "raster graph" refers to an image or a graph that is represented by a grid of pixels. In some embodiments, a raster image is viewable via a computer display, paper, or other display medium. In some embodiments, a raster image includes colors.

The term "substructure" refers to a component of a character that may have a meaning or may have no meanings. In some embodiments, a substructure is a radical component of the character. In some embodiments, a substructure is a phonetic component of the character. In some embodiments, a substructure includes any component of a character. In some embodiments, a substructure includes the entire character.

The term "graphical representation" or "graph representation" refers to representing the structure of a character using nodes and/or edges on a two-dimensional graph. In some embodiments, a node is identified and/or positioned each stroke (e.g., line segment, or line) ending and/or each joint (point at which a line diverges) of the character. In some embodiments, an edge is identified and/or positioned at each line between two nodes that are connected in the character. In some embodiments, the nodes can be represented by a set of two-dimensional coordinates. In some embodiments, the edges can be represented by a matrix (e.g., an adjacent matrix). Accordingly, the structure of the character can be represented by a data set including a set of two-dimensional coordinates and a matrix (e.g., adjacent matrix). Advantageously, such graphical representation of a character can be compact as compared with a raw image of the character.

The term "heuristic threshold" refers to a threshold used in heuristics or heuristic techniques. A "heuristic technique" refers to any approach to problem solving or self-discovery that employs a practical method that may be sufficient for reaching an approximation. Where finding an optimal solution is impossible or impractical, heuristic methods can be used to speed up the process of finding a satisfactory solution. Examples that employ heuristics include using trial and error, a rule of thumb or an educated guess.

The term "adjacent matrix" or "adjacency matrix" refers to a matrix (e.g., a square matrix) used to represent a graph, where the elements of the matrix indicate whether pairs of vertices are adjacent or not in the graph.

The term "tree" or "tree graph" refers to a graph (e.g., undirected graph) or structure that includes a set of objects (e.g., nodes), in which at least some pairs of the objects are related. In some embodiments, two objects of a tree are connected by one path. The term "node" or "point" in this scenario refers to the object in the graph. The term "edge" or "line" in this scenario refers to the connection between the related pairs of nodes.

The term "skeleton" is equivalent to the term "connectivity" in a description of a matrix.

The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Having thus described several aspects of at least one embodiment of this invention, it is to be appreciated that some alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

All references, issued patents and patent applications cited within the body of the specification are hereby incorporated by reference in their entirety, for all purposes.

The invention claimed is:

1. A method for searching characters in a database, comprising:

obtaining a character substructure, the character substructure being represented by a set of nodes and a set of edges and representing one or more potential meanings;

enumerating a set of possible combinations of nodes in a tree graph;

reducing the set of possible combinations of nodes by extracting one or more metrics to exclude impossible combinations with a threshold;

searching for the character substructure in the characters via possible combinations of nodes;

matching one or more characters to one or more nodes of the set of possible combinations of nodes;

generating output characters comprising the character substructure based on the matching; and displaying at least a part of the output characters comprising the character substructure.

2. The method of claim 1, further comprising predicting one or more meanings of the output characters based on the character substructure.

3. The method of claim 2, further comprising displaying the one or more predicted meanings of the output characters.

4. The method of claim 1, wherein the metric comprises at least one of node branch diff, connectivity diff, posture diff, and/or inter-component diff.

5. A system for searching characters in a database, comprising:

one or more processors; and a memory coupled with the one or more processors, wherein the processor executes a set of stored computer instructions, that when executed:

obtain a character substructure, the character substructure being represented by a set of nodes and a set of edges and representing one or more potential meanings;

enumerate a set of possible combinations of nodes in a tree graph;

reduce the set of possible combinations of nodes by extracting one or more metrics to exclude impossible combinations with a threshold;

search for the character substructure in the characters using the set of possible combinations of nodes;

match one or more characters to one or more nodes of the set of possible combinations of nodes;

generate output characters comprising the character substructure based on the match; and display at least a part of the output characters comprising the character substructure.

6. The system of claim 5, wherein the one or more characters comprise at least 80,000 characters.

* * * * *